Feb. 25, 1941. E. A. RAINES 2,233,325
GAUGE HATCH
Filed July 26, 1937 2 Sheets-Sheet 1

Inventor
E. A. Raines
By Munn, Anderson & Liddy
Attorney

Feb. 25, 1941.  E. A. RAINES  2,233,325
GAUGE HATCH
Filed July 26, 1937   2 Sheets-Sheet 2
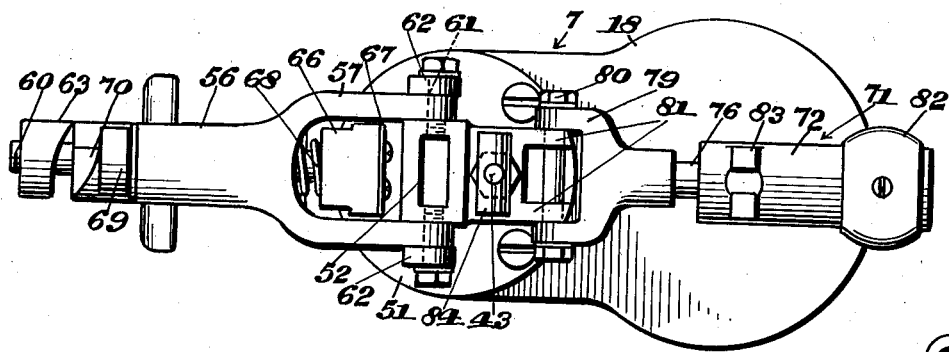
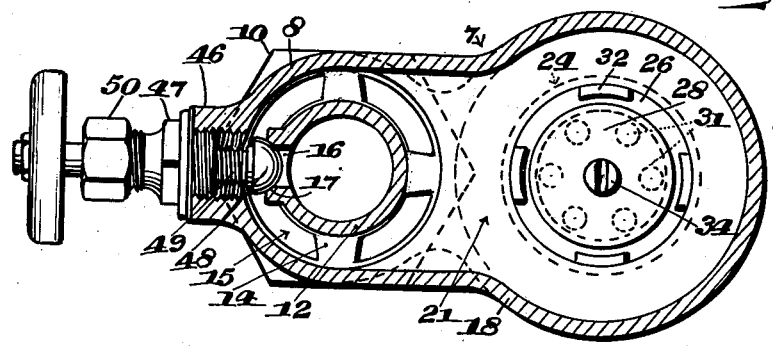
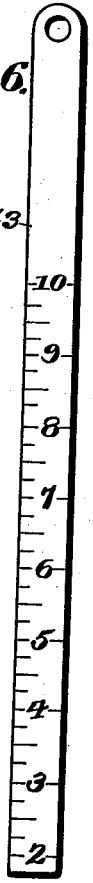
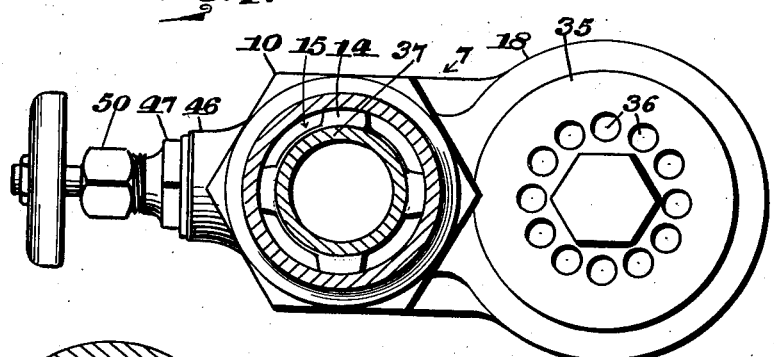
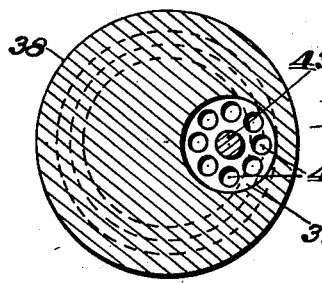
Inventor
E. A. Raines
By Munn, Anderson & Liddy
Attorneys Patented Feb. 25, 1941

2,233,325

UNITED STATES PATENT OFFICE 2,233,325

GAUGE HATCH

Ewell Alonzo Raines, Tulsa, Okla.

Application July 26, 1937, Serial No. 155,761

8 Claims. (Cl. 220—86)

This invention relates to improvements in gauging or measuring apparatuses, and its objects are as follows:

First, to provide a device for use in conjunction with liquid storage tanks, more particularly closed storage tanks, in which device it is possible to accurately measure the depth of the liquid contents by entrapping a small quantity thereof for measurement, at the same time escaping the effect of whatever internal vapor pressure there may be in order to do so, and this without venting the vapor to atmosphere.

Second, to provide a device having the foregoing characteristics, which is herein known as a gauge hatch inasmuch as it makes provision for the insertion of a gauge or thermometer through an opening or hatch, particularly without wasting the internal vapor.

Third, to provide a gauge hatch which occupies only a single opening in the tank, and through said opening accommodates all of the means of control of the vapor pressure, vacuum release, the hydrostatic column and the gauge stick or tape for the gauging or measuring operation.

Fourth, to provide a gauge hatch which, according to the foregoing statements, enables the measurement of the entrapped liquid contents of a closed storage tank regardless of the internal pressure conditions, whether above or below atmosphere.

Fifth, to provide a gauge hatch which, conversely to the above, also functions as a means for venting the tank for either excessive or abnormally low internal tank pressures during the filling and emptying of the tank, starting at a given pressure or vacuum index figure.

Other objects and advantages will appear in the following specification, reference being had to the accompanying drawings in which—

Figure 2 is a plan view of the gauge hatch, both the hatch and valve locks being down.

Figure 3 is a cross section taken on the line 3—3 of Figure 1.

Figure 4 is a cross section taken on the line 4—4 of Figure 1.

Figure 5 is a cross section taken on the line 5—5 of Figure 1.

Figure 6 is an elevation of the gauge stick which is used in conjunction with the gauge hatch.

Figure 1:
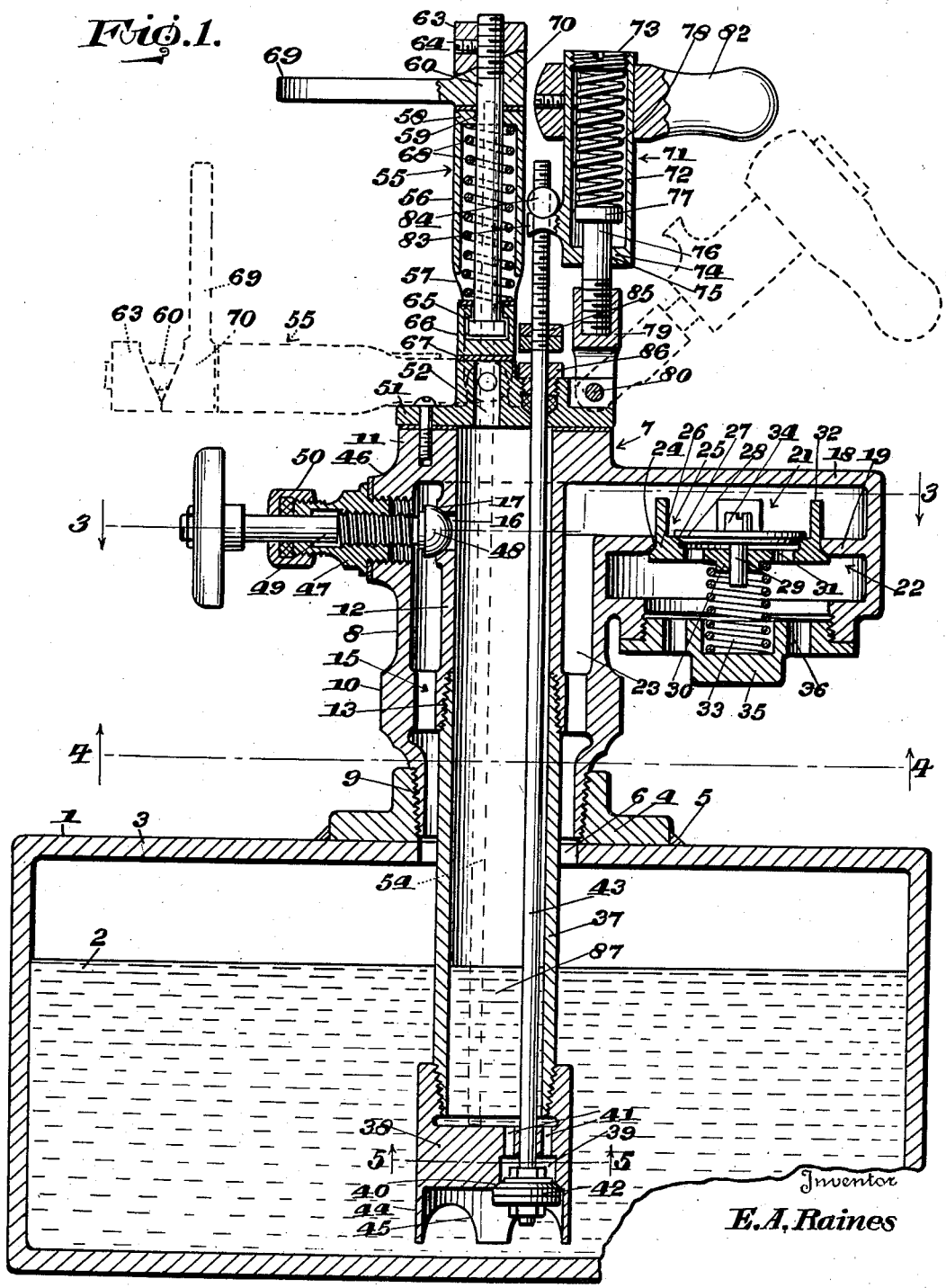
Figure 1 is a vertical section of the gauge hatch, illustrating its permanent installation upon a closed container which is also shown in section.

The herein used term "gauge hatch" means a contrivance which is permanently affixed to a closed container and has an opening or hatch through which a gauge stick or equivalent measuring device is insertible for a determination of the quantity of fluid, usually liquid, in the container. The example used in this disclosure is that of a closed container 1 which may comprise any known kind of tank in which there is a volume of gasoline 2. Inasmuch as said contrivance has facilities for shutting off a small portion of the contents of the container from the rest of the contents of the container in order to serve as an index as to what the volume of the total contents is, it can be understood that the principle of said contrivance is not confined to measuring gasoline, but can be used for the measurement of other fluids, whether gaseous or liquid, in closed containers.

By way of preface it is desired to point out that one of the main purposes which the improvement has is the conservation of the gasoline 2 by guarding against the escape of the vapor in the space 3 when a measurement of the gasoline volume is made.

One can readily understand that if the container 1 were opened to atmosphere preparatory to inserting the gauge stick (Fig. 6), there would be an immediate escape of a large quantity of the vapor from the space 3. The later closing of the container would be followed by further evaporation of the gasoline, only to represent a further loss when the container is again opened for later gauging. It will presently be understood how the gauge hatch prevents all but an infinitesimal loss of vapor in the ordinary run of gauging operations.

But then the gauge hatch performs other functions, one of which does not take into account the loss of gasoline vapor. In the event of the internal pressure becoming excessive, or in the event of the internal pressure becoming subnormal, a duplex valve functions either to vent the container for the excessive pressure or to let in atmospheric air. The details of the invention are now described.

A flange or fitting 4 is welded at 5 or otherwise permanently secured to the container 1, around and in continuation of its single opening 6. The gauge hatch is indicated 7 in its entirety. This comprises a casing 8 with a threaded nipple 9 which is screwed tightly into the flange 4 by applying a wrench to the hexagonal or other non-circular annulus 10.

The casing terminates in a seat 11 at the top.

This seat has an integral depending well sleeve 12. This sleeve is internally threaded at 13, and this terminal is connected to the casing 8 by a web 14 (Fig. 3) which supplies the desired and necessary rigidity of the well sleeve. The web 14 is in the form of a plurality of spokes, the spaces 15 providing vapor passageways. There is an opening 16 in one side of the well sleeve 12, the outer edge of which is flared to provide a valve seat 17.

An extension 18 goes off to one side of the casing 8. This has a partition 19 and a mouth 20. The partition makes a division between the spaces 21, 22, the former being in constant communication with the annular space 23 around the well sleeve 12, the latter constituting a discharge chamber.

An opening 24 in the partition 19 provides the seat for a duplex valve generally designated 25. This comprises two valves, as the name implies. The large valve 26 occupies the seat 24 and is adapted to open outwardly in the direction of the chamber 22. Said valve 26 has a seat 27 on which its companion valve 28 rests. The valve 28 is adapted to open inwardly in the direction of the space 21. It has a short stem 29 which is guided by the wall of an opening in the web 30 of the valve 26. This web has perforations 31 through which vapor and air pass outwardly and inwardly respectively. The valve 26 has upstanding flanges 32 which rub against the wall of the opening 26 and do the guiding as said valve opens and closes.

A spring 33 tends to keep the valve 26 seated and also limits the extent of opening of said valve under internal container pressure. A head 34 or other type of stop on the valve 28 limits its opening movement. A cap 35 which is screwed into the mouth 20 provides a rest for the spring 33. This cap is perforated at 36 for the passage of fluid.

A well tube 37 extends from the well sleeve 12, its upper end being screwed into the threaded bore 13. Said tube and sleeve are collectively regarded as a well tube structure. This tube 37 extends through the opening 6 and down into the gasoline 2 by which a valve fitting 38 is submerged. This fitting is attached to the lower end of the tube 37, usually by screw threads. It has a chamber 39 which terminates at one end in a valve seat 40 and at its other end communicates with a number of holes 41 which open into the interior of the well tube 37. A valve 42 is intended to make a tight seal upon the seat 40 when it is closed, and this valve has a long stem 43 which reaches up through the composite well tube 37 to a place of exposure at the top of the gauge hatch 7.

Reverting to the fitting 38, the lower end of this ends in a thin shell 44 which is scalloped at 45. The shell defines a chamber, in a sense, in which the valve 42 has its opening and closing movements. In the event that the fitting 38 should be lowered closer to the bottom of the container than shown in Figure 1, the rim of the shell 44 would serve as limiting means to prevent such a close approach of the fitting to the bottom as would prevent the functioning of the valve 42, bearing in mind, however, that the entrance to valve chamber 39 must be kept above the water level.

An enlargement 46 of the casing 8 in line with the opening 16 is bored and threaded to support the body 47 of a valve 48. This valve makes a seal upon the seat 17. Its threaded stem 49 is screwed into the body 47, and the more or less ordinary gland 50 guards against the escape of pressure fluid.

An element 51, hereafter known as the hatch, is secured to the seat 11 and has an opening 52, the lower end of which is in communication with the well tube 12, 37. The hatch opening is rectangular (Fig. 2), being made this way to accommodate the cross sectional shape of the gauge stick 53 (Fig. 6), which is adapted to be inserted through the hatch opening (dotted lines 54, Fig. 1) into the entrapped gasoline in the bottom of the well tube. The hatch opening 52 is always closed by a hatch lock 55 (full lines, Fig. 1) excepting when a measurement is to be made (dotted lines, Fig. 1).

Said hatch lock comprises a hollow cylinder 56 which has one end forked at 57 (Fig. 2), and the other end bridged over by a web 58 (Fig. 1) which, however, has a central hole 59 for the occupancy and guidance of a rod 60. The forks 57 are journaled on trunnions 61 (Fig. 2) which are affixed to upstanding lugs 62 on the hatch 51. These trunnions are shown as consisting of machine screws, and their ends may or may not be threaded into the metal in which the hatch opening 52 is made.

A cam head 63 is secured at 64 to the upper extremity of the rod 60 (Fig. 1). The lower end of this rod has a swivel connection 65 with a hatch closure 66. This closure is a valve, and it is faced with leather 67, or some other suitable equivalent, to make a tight seal around the hatch opening 52 when the hatch lock is closed. This seal depends upon a spring 68 which occupies a hollow cylinder 56, having its upper end raised against the web 58 and its lower end against the closure 66.

As will be understood from Figure 1, the hatch lock 55 is adapted to swing on the trunnions 61. In order to lift the closure 66 preparatory to displacing the hatch lock for the insertion of the gauge stick 53 it is necessary to turn a lever 69 which has a cam head 70 mounted on the rod 60 directly beneath the cam head 63. When this turning of the lever is done, the two cam surfaces coact in such a way (see dotted position in Figure 1) as to raise the rod 60 and, consequently the closure 66. The latter will then clear the adjacent left corner of the hatch 51 when the lock is swung over.

A valve lock 71 insures the holding of the valve 42 against its seat 40. This lock comprises a hollow cylinder 72, the upper open end of which is capped at 73. The lower webbed end 74 has a hole 75 in which a stud 76 fits. The inner headed end 77 of this stud supports one end of a stout spring 78, the other end of which is rested against the cap 73. The stud 76 is screwed into a forked knuckle 79 (Fig. 2) which is journaled on a bolt or pin 80. This pin goes through lugs 81 on the hatch 51.

A handle 82 which is fixed upon the cylinder 72 facilitates moving the valve lock 71 to its locking (full lines Fig. 1) and unlocking (dotted lines) positions. One side of the cylinder 72 has a crotch 83 on to which a cross pin 84 on the exposed end of the stem 43 is hooked. Said end of the stem is threaded, and the cross pin 84 is screwed upon the threads. This enables a limited up and down adjustment of the cross pin and a consequent adjustment of the tension of the spring 78. If the cross pin were adjusted lower than shown in Figure 1, the crotch 83 would necessarily have to be lower in order to catch under it and this in turn would lower the entire cylinder 72. There would be a greater compression of the spring 78 than exists with the shown adjustment, and the valve 42 would be drawn up more tightly against its seat.

Mention was made of the limiting function of the thin shell 44 as regards the opening of the valve 42. The opening of the valve is directly regulated by an adjustable stop 85 which is adapted to engage the gland nut 86 in which the stem 43 slides. This stop comprises a pair of nuts which are screwed on to the threaded end of the stem, and their use has the advantage of preventing any part of the valve 42 from striking the bottom of the container. The valve 42 is intended to be normally open, into which position it is pushed by finger pressure upon the cross pin 84, this because its stem 43 has a fairly tight frictional fit in its two bearings, at least in the top gland.

Upon desiring to close the valve 42, the handle 82 is brought up until the crotch 83 touches the side of the cross pin 84. A sharp blow upon the top of the handle 82, diagonally downward in the direction of the stem 43, will drive the crotch under the cross pin whereupon the spring 78 will again lift the valve 42.

The operation is readily understood. Assume that it is first desired to obtain a gauge at atmospheric pressure, which, for the purpose of distinction, is called gauge A. Reference is made to Figure 1. The tank 1 is of a known capacity in gallons and corresponding inches. In the initial filling of the empty tank 1 from a railroad tank car shipment a measured or metered volume of gasoline is pumped into the tank 1 through a connection usually in the bottom of the tank. This mathematically gives a given depth of gasoline in inches that should be in the tank 1 after it is filled. This depth is checked by the compensating gauge stick (Fig. 6) at atmospheric pressure in the space 3 with the valve 42 closed but with the valve 48 and the hatch 67 open. There is no vapor pressure either upon the liquid surface at point 2 or its equivalent surface within the pipe 37. The reading of the compensating stick (Fig. 6) after being run in the well 87, in inches should correspond to the then known gallons in inches the tank 1 has received from the tank car shipment. The time required to drop the stick through the hatch opening 67 and get a maximum gauge of the liquid level upon the stick, will be too short for the gasoline displaced and forced above the true liquid level in the tank, and by the insertion of the stick, to escape through the valve 43 back into the tank. This gauge A can be taken regardless of the height of the liquid level of the gasoline in the tank and a corresponding stick reading can be had.

The phase of the operation is to obtain a gauge with the tank 1 carrying a vapor pressure that is greater than atmospheric pressure, this being called gauge B for the purpose of distinction. With the valves 48 and 42 closed and with a vapor pressure of say one pound per square inch above atmospheric pressure in the space 3, to gauge the tank 1 under pressure without releasing the pressure or its vapor, we would only open the hatch at 67 and insert the gauge stick (Fig. 6) and take our reading in inches and corresponding gallons.

A comparison of readings is now made of the results obtained from the foregoing gauges A and B. The example taken is that of a known ten foot depth of gasoline in tank 1. Reading from gauge A, when tank 1 is gauged as in the manner of gauge A, the stick being compensated to take care of its own displacement of gasoline in the well 87 will read ten ft., when the stick (Fig. 6) is dropped quickly to the bottom of the well 87 and jerked quickly up for reading. The gasoline level in the well 87 is the same as the gasoline level in the tank 1 before the gauge stick (Fig. 6) is inserted through the hatch opening 67, regardless of the time that has elapsed since opening the hatch at 67 as there is no vapor pressure in space 3 to create a hydrostatic head in the well 87 should the valve 42 be leaky with the valve 48 and the hatch 67 open at the same time. This gives us our true reading of 10 ft. height in the tank.

Reading from gauge B; when the tank 1 is gauged in the manner of gauge B, the gauge reading will be 10 ft. in height on the stick (Fig. 6) when the valve 42 is in good condition. The vapor pressure in space 3 will have no effect upon the reading of gauge B as long as valve 42 does not leak. Readings of gauges A and B will both be the same or 10 ft. without a leaky valve 42.

After the hatch 67 has been left open five or ten minutees with a leaky valve 42, the vapor pressure in the space 3 will force a hydrostatic head of gasoline up into the well 87 through the leaky valve 42. Then when the stick (Fig. 6) is run into the well 87 the height of the hydrostatic head will be added to and recorded on the stick to the true reading of 10 ft. One pound pressure within the tank would be sufficient to force this head of gasoline approximately three feet. Then there would be a recorded reading of 10 plus 3 equals 13 ft. with a leaky valve 42.

Therefore, to find a leaky valve 42, gauge the tank under pressure then gauge it after this pressure is released through valve 48 and hatch opening at 67 and compare the two gauge readings of A and B. When the readings are the same the valve 42 does not leak. If the readings are not in balance the valve 42 does leak and needs repairing. The operator can always make his test at the time when the space 3 above the gasoline is the smallest, thereby releasing the smallest amount of vapor from the tank. This test will be unnecessary as long as the operator's records of metered or measured receipts and disbursements to and from the tank leaves the contents of the tank in approximate balance with his gauge reading B which he is to use under normal operating conditions.

I claim:

1. A gauge hatch comprising a well tube structure which has an opening at each extremity, a casing in which the well tube structure has fixed connection, said casing being spaced from the well tube structure and having means by which it is tightly affixed to a container so that the well tube structure is suspended in said container, said well tube structure having a side opening adjacent to one of its extremities communicating with the space, a valve for each of the respective openings at the extremities of the well tube structure, and a valve body mounted upon the casing, having a stem operating across the space and carrying a valve to engage the side opening.

2. In a gauge hatch, a casing, a well tube structure carried by the casing, said tube structure having an opening at the top of the casing and having a bottom opening, a valve carried by the casing to control a lateral opening in the tube structure adjacent to said top opening, a valve to control the bottom opening, an upwardly extending valve stem, lock means to support the stem and hold the bottom valve closed, and lock means to seal the adjacent top opening.

3. In a gauge hatch, a casing which has a seat around a top opening, a hatch attached to the seat and having an opening in communication with said top opening, a hatch lock which consists of a swingable element, a hatch closure with a spring to press said closure over the hatch opening, and cam means which is operable to raise the hatch closure against the tension of the spring preparatory to swinging the hatch lock out of the way so as to clear the hatch opening for the insertion of measuring means.

4. In a gauge hatch, a casing, a well tube pendent therefrom having a bottom opening, a seat on top of the casing at which the well tube has a top opening, a hatch attached to the seat, a valve for the bottom opening having a stem extending upward through the hatch to a point thereabove, a cross pin on said valve stem, a valve lock to secure the valve in its closed position, said lock consisting of a swingable element that has a crotch to hook under the cross pin, and means embodied in said lock to make the crotch hold the cross pin up under pressure.

5. A gauge hatch comprising a casing having means for the securement of the casing in an opening of a container of gasoline and the like, a well sleeve inside of the casing and in spaced relationship thereto, a fitting having a chamber therein with an entrance, a well tube fixedly carrying the fitting and having the chamber in communication therewith, and being of a length to suspend the fitting in permanently spaced relationship to the bottom of the tank, coupling means with which the well tube is fixedly suspended from said sleeve, said well tube also being spaced from the casing, a valve with which to open and close the entrance to the chamber, thereby to regulate the admission of gasoline to the interior of the well, and a valve operable in the well sleeve to provide for an equalization of vapor pressures between the inside of the sleeve and tube and the space therearound.

6. In a gauge hatch, a superstructure adapted to be tightly secured to a container of volatile liquid and the like, a tubing structure internally spaced and fixedly pendent from said superstructure defining a vapor pressure chamber outside of the tubing structure in constant communication with the interior of the container and depending into the container, said superstructure having an opening between the chamber and the interior of said tubing structure, and valve means externally accessible and directly operable in respect to said opening, said valve means being carried by said superstructure and adapted for independently transferring pressure fluid from said chamber to the inside of the tubing structure.

7. In a gauge hatch, a casing, a well tube pendent therefrom having a bottom opening, a seat on top of the casing at which the well tube has a top opening, a hatch attached to the seat, a valve for the bottom opening having a stem extending upward through the hatch, a valve lock to secure the valve in its closed position, said lock consisting of a swingable element embodying telescopic parts, a spring acting upon said parts to urge them toward one extremity of their telescopic movement, and means on one of the telescopic parts adapted to make contact with a portion of the stem, the tension of said spring maintaining said contact.

8. In a gauge hatch, a superstructure adapted to be tightly secured to a container of volatile liquid and the like, a tubing structure internally spaced and fixedly pendent from said superstructure defining a vapor pressure chamber outside of the tubing structure in constant communication with the interior of the container and depending into the container, said superstructure having a primary opening between the chamber and the interior of said tubing structure and a secondary opening in permanent communication with the inside of the tubing structure and communicable with the outer atmosphere, valve means externally accessible and directly operable in respect to said primary opening, said valve means being carried by said superstructure and adapted for independently transferring pressure fluid from said chamber to the inside of the tubing structure, a hatch cover to close the secondary opening, and pressure means carried by the superstructure to press upon the cover when closed for holding the cover on said secondary opening.

EWELL ALONZO RAINES.